May 30, 1961 W. L. LINDLEY 2,986,189
WHEEL RIM ATTACHMENT FOR TUBELESS TIRE
Filed Jan. 30, 1959
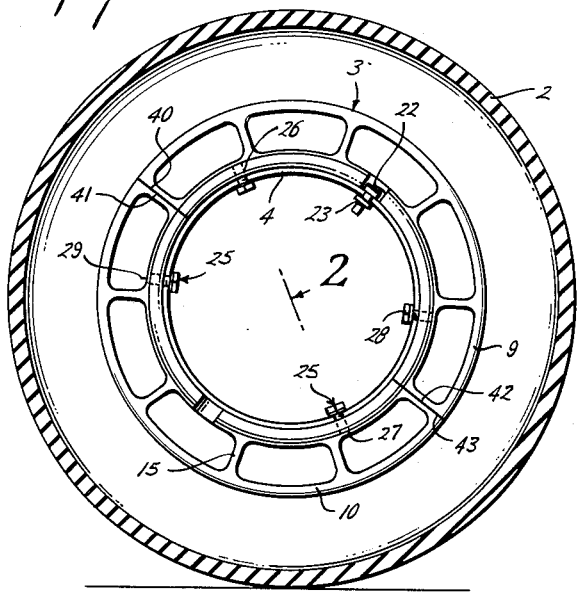
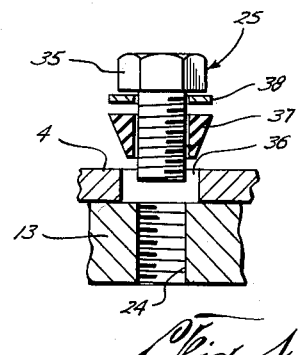
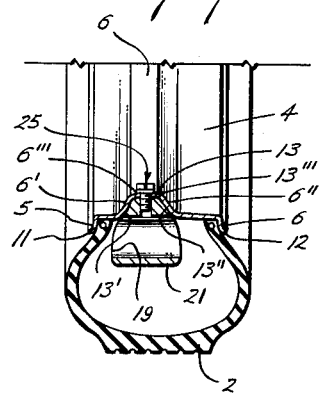
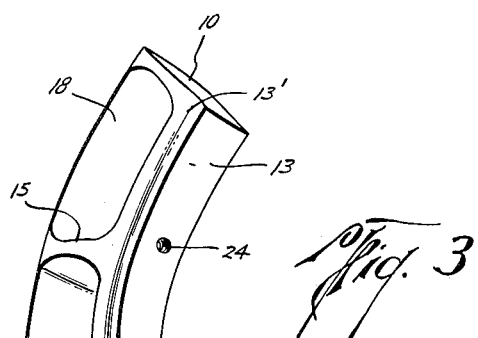
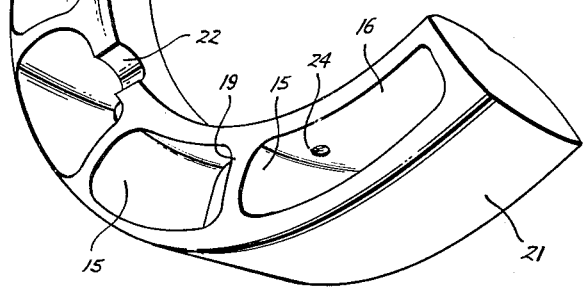
William L. Lindley
INVENTOR.
BY Hayden & Pravel
ATTORNEYS

United States Patent Office 2,986,189
Patented May 30, 1961

2,986,189

WHEEL RIM ATTACHMENT FOR TUBELESS TIRE

William L. Lindley, P.O. Box 12013, Houston, Tex.

Filed Jan. 30, 1959, Ser. No. 790,199

2 Claims. (Cl. 152—158)

The present invention relates to a device adapted to be secured to a wheel rim, and to act as a safety support for a tubeless tire mounted on the rim, particularly when the tire deflates.

Various devices have been heretofore proposed in an endeavor to safely bring a vehicle to a stop when one of the tires becomes deflated due to a flat or a blowout. The advent of the tubeless tires has increased the desirability and need for a suitable construction which may be mounted on the wheel rim, so as to support the tire away from the rim if it becomes deflated when the vehicle is in motion. All of the constructions heretofore contemplated have substantial objections in that they cause great difficulty in trying to maintain the wheel of the vehicle balanced, and they are also generally a permanent part of the wheel rim, thereby making it extremely difficult to remove and replace the tire as necessary.

Also, it is desirable to provide a surface for supporting the tire in spaced relation from the rim when the tire is deflated, which surface is of substantial extent so as to provide a maximum support area for the tire. All of the devices heretofore proposed, while endeavoring to accomplish this function, do not provide sufficient support for the large surface area so that when it is used for the first time, the weight of the vehicle when directly applied to the surface causes the device to break or bend so as to throw the wheel out of center. Where the safety device is an integral part of the wheel, this then necessitates that the entire wheel be discarded, since it is extremely difficult to straighten such devices, or to try to place them in proper balance for subsequent use on the vehicle.

The present invention relates to a relatively simple device which can be quickly and easily positioned on the wheel rim of a vehicle for use with tubeless tires, so as to support the tubeless tire in spaced relation off the wheel rim when the tire deflates.

Still a further object of the present invention is to provide a safety device for attaching to the wheel rim to be used in conjunction with a tubeless tire, which device provides a substantial area for engagement with the tire when it deflates to inhibit damage to the tire.

Yet a further object of the present invention is to provide a device adapted to be attached to the wheel rim of the vehicle for supporting a tire in spaced relation to the wheel rim when the tire deflates, which device includes a substantial surface area for contacting the tire when it deflates to inhibit damage to the tire, and a construction and arrangement of sufficient strength so as to carry the weight of the vehicle when the tire is deflated and supported on the large surface area of the device.

Still a further object of the present invention is to provide a device of relatively simple construction which may be quickly and easily positioned for use on the wheel rim of a vehicle, so as to support a tire on the wheel rim when the tire is in deflated position to inhibit the tire from being cut or otherwise damaged by the wheel rim.

Another object of the present invention is to provide a device adapted to be attached to the wheel rim of the vehicle for supporting a tire on the wheel rim in deflated position so as to inhibit damage to the deflated tire, which device may be quickly and easily positioned on the wheel rim, and is of sturdy construction so as to function in the desired manner a repeated number of times without damage to the device, and without throwing the wheel out of balance.

Still another object of the present invention is to provide a balanced device for attaching to the wheel rim of a vehicle for supporting a tire in deflated position on the wheel rim without damaging the tire, and which device may be quickly and easily positioned on the rim and removed therefrom, as desired.

Still another object of the present invention is to provide a device for attaching to the wheel rim of a vehicle for supporting a tire when it is deflated in spaced relation to the wheel rim to inhibit damage to the tire, which device can be installed on the rim without any special tools or equipment, and which device will not throw the wheel out of balance when it is positioned thereon, or even after repeated use.

Other objects and advantages of the present invention will become readily apparent from a consideration of the following drawings and description, wherein:

Fig. 1 is a side view illustrating the device of the present invention in position on a wheel rim and surrounded by a tire;

Fig. 2 is a sectional view on the line 2—2 of Fig. 1 to further illustrate the structural details of the present invention and its relationship to the wheel rim on which it is mounted, and the tire on the wheel rim;

Fig. 3 is an isometric view of one semi-circular portion of the present invention for illustrating aditional details of construction of the present invention; and Fig. 4 is an enlarged exploded view of the means for securing the device on the wheel rim.

Attention is directed to Fig. 1 of the drawings, wherein a vehicle tire of the tubeless type is represented by the numeral 2. The device of the present invention is represented generally by the numeral 3 and is illustrated as being positioned on the wheel rim 4. The wheel rim 4 is of the drop-center type and is more clearly illustrated in Fig. 2 of the drawings.

It will be noted that the wheel rim 4 has the upstanding annular side flanges 5 and 6 which serve to support and retain the tubeless tire 2 in position on the wheel rim 4, and is also provided with a depressed portion 6' which is offset relative to the axis of the wheel rim 4, as clearly illustrated in Fig. 2 of the drawings.

The device 3 includes two semi-circular portions 9 and 10, which when positioned on the wheel rim 4 as shown in Figs. 1 and 2 of the drawings, provides a continuous circular surface for supporting the tire 2 if and when it becomes deflated so as to support the tire 2 away from the ends 11 and 12 on the annular side edges 5 and 6 of the rim 4 to inhibit damage to the tire as the vehicle continues in motion.

The construction of the semi-circular portions is better illustrated in Fig. 3 of the drawings, wherein one of the semi-circular portions as indicated at 10 is shown. It will be noted that the semi-circular portion 10, as well as the semi-circular portion 9, each include a semi-circular member 13, which member 13 has an inner surface including the side surfaces 13', 13'', and the bottom, or annular peripheral surface 13''', to provide a configuration on each semi-circular member 13 so as to fit each half-portion 9 and 10 snugly within the depressed area 6 of the wheel rim 4 as illustrated in Fig. 2 of the drawings. In this manner, each half-portion 9 and 10 is firmly seated relative to the rim 4 and retained in position by reason of the support provided to each semi-circular portion 9 and 10 by reason of the side surfaces 6' and 6" of the depressed area 6 contacting the adjacent sides 13' and 13" respectively of the semi-circular members 13 of the half portions 9 and 10.

Also, the bottom 6''' of the depressed portion 6 contacts the inner surface 13''' of each of the members 13, which surface 13''' is of substantial width and relatively flat. Thus, the semi-circular member 13 of each half portion 9 and 10, including its side surfaces 13', 13" and its peripheral surface 13''' abut the adjacent portions 6', 6" and 6''' of the rim 4, whereby a substantial support surface between the rim 4 and each semi-circular portion 9 and 10 is provided. This prevents wobbling of the half portions 9 and 10 after an extended period of use, and thereby helps to maintain the wheel in proper balance, and aids in preventing the device from throwing the wheel out of balance when the inside of tire 2 moves against the surface 21 of each semi-circular portion 9 and 10 upon deflation of the tire 2.

Each semi-circular member 13 includes the radially extending projections 15 which extend from the semi-circular member 13. The radially extending projections 15 are connected at their outer ends with a second semi-circular member 18 which is in spaced relation to the inner semi-circular member 13, a distance corresponding to the length of the radial projections 15. It will be noted that the radial projections 15 are flared on their sides as illustrated at 19, and are continuous surfaces as shown in Figs. 1, 2 and 3 of the drawings. The second semi-circular member 18 is provided with an outer annular peripheral surface 21 which is wider than the surface 13''' of the first named semi-circular annular member 13.

As illustrated in the drawings, it will be noted that the semi-circular portion 10, including the first named semi-circular member 13, the projections 15 and the second semi-circular member 18 are integrally formed. The semi-circular portion 9 is of a similar construction and may also be integrally formed, and is preferably formed of suitable metal such as aluminum or the like. Any suitable metal or material may be used, and it has been found that aluminum, or an aluminum alloy serves the purpose quite well in that it is sufficiently strong to perform the function of the present invention, while being sufficiently light so that it may be easily and readily installed.

Each half portion 9 and 10 is provided with a cut-away as illustrated at 22, whereby the tire valve 23 may be received therein as the device is positioned on the wheel rim 4.

Any suitable means may be used to retain each semi-circular portion 9 and 10 in position on the rim 4, and it will be noted that holes 24 are drilled in the semi-circular member 13 of each half portion 9 and 10 for receiving screws as illustrated generally at 25 in Fig. 1. It will be further noted that the holes 24 in each half portion 9 and 10 are spaced relative to each other so that when the device 3 is positioned on the wheel rim 4, the opening and the screw as illustrated at 26 will be diametrically opposed to the opening and screw in the half portion 10 as illustrated at 27. Also the opening and screw as illustrated at 28 will be diametrically opposed to the opening and screw as illustrated at 29 in the half portion 10. This will serve to balance the screws in each half portion 9 and 10 to inhibit the device 3 from becoming out of balance when it is positioned on the wheel rim 4. It will be also noted that the cut-outs 22 for the valve stem are in opposed diametric relation when the semi-circular portions 9 and 10 are positioned on the wheel rim 4, and this is also to aid in providing balance and stability to the mechanism when in use.

The screws are illustrated in greater detail in Fig. 4 of the drawings, and it will be noted, as previously mentioned, that the inner semi-circular member 13 of each half portion 9 and 10 is provided with threaded openings 24 to receive the threaded screws 35. An opening 36 is provided at spaced suitable intervals in the wheel rim 4 for receiving the threaded screws 35, and in order to inhibit leakage of air from the tubeless tire 2, a gasket as illustrated at 37 surrounds the threaded screws 35 and a washer 38 is arranged to abut the top of the gasket 37. The gasket 37 is formed of resilient material and when the screw 35 is threadedly positioned in the opening 24, the gasket 37 will fill the opening 36 and inhibit any leakage from the opening 24 in the inner semi-circular member 13.

One of the advantages of the present invention is the ease with which it can be installed on the wheel rim 4. Each semi-circular portion 9 and 10 will be first positioned inside the tire 2 when the tire is off the wheel rim 4. Thereafter, the tire 2 is positioned on the rim 4 in a manner well known in the art. At this time the semi-circular portions 9 and 10 will be loose in the tire, and generally the edges of the tire will be out of position in relation to the annular edges 5 and 6 of the rim 4, so that it is first necessary to position the edges of the tire adjacent the rim edges 5 and 6. To accomplish this, suitable plug means may be inserted in the openings 36 of the wheel rim and air passed into the tubeless tire 2 so that it will move to the position shown in Fig. 2 of the drawings. Thereafter the plugs may be removed from the openings 36 and any suitable means such as a screwdriver, a pencil or nail may be engaged through any one of the opennigs 36 and the semi-circular portions 9 and 10 moved circumferentially around the wheel rim until one of the openings 22 in the rim is aligned with the valve stem 23, whereupon the openings 36 will mate with the openings 24 in the inner annular member 13. Thereafter, the screws 25 will be inserted through the opening 36 and into the opening 24 as shown in Fig. 4 of the drawings to firmly position the two semi-circular portions 9 and 10 on the wheel rim. Since each portion 9 and 10 of the device 3 is semi-circular, they will be in abutting relationship at their ends 40, 41, 42, 43, as illustrated in Fig. 1 of the drawings.

In view of the construction and arrangement of the device, it is firmly seated on the wheel rim 4 when the screws or bolts 25 are in position in the inner annular member 13 of each semi-circular portion 9 and 10 as previously described. The rim and the surfaces 6', 6" and 6''' cooperate with the surfaces 13', 13" and 13''' to provide ample support to the semicircular portions 9 and 10 of the device 3 to retain it in place. Also the construction and arrangement of each half portion 9 and 10 is such that it will counterbalance or offset any bolt hole or cut-away in the other half portion as previously described herein. The radial projections 15 are arranged in each half portion so that they will be diametrically opposed to a radial projection in the other or opposed half portion so that the construction is in balance and will not throw the wheel out of balance when it is positioned on the rim.

In view of the large surface area 21 on each of the second annular members 18, a substantial surface area is provided for contacting the tire 2 when the tire is deflated. The large area 21 distributes the weight of the vehicle over a larger surface area of the deflated tire 2 and inhibits damage thereto by reason of the weight of the vehicle, and inhibits damage to the deflated tire, in that it prevents the deflated tire from contacting the ends 11 and 12 of the rim edges 5 and 6.

The support and arrangement of each half portion 9 and 10 relative to each other on the rim 4, and the support and arrangement of the device 3 on the rim is such that it will not be thrown out of balance when a deflated tire contacts the peripheral surface 21 of the second annular member 18 of each half portion 9 and 10. The device is relatively simple in construction, and from the foregoing description it can be seen that it can be quickly and easily positioned on the wheel rim for use.

It may be removed merely by loosening the bolts 25 and the tire 2 removed from the wheel rim. Thereafter, the half portions 9 and 10 may be manually removed from the tire.

Broadly the invention relates to a device which can be quickly and easily positioned on a rim to inhibit damage to a tire when the tire becomes deflated, and which maintains its balance on the wheel during rotation of the wheel, and even after it has been used any number of times to support the deflated tire on the rim, while a vehicle is being brought to a stop, or is being moved to a location for changing of the deflated tire.

What is claimed is:

1. A device adapted to be positioned inside a tubeless tire and secured to a wheel rim of the drop-center type which supports the tire including, two semi-circular portions, each portion having a semi-circular member with an inner surface of a configuration to fit on the outer periphery of the wheel rim, each of said semi-circular members having a center portion extending therefrom, said center portion being adapted to fit in the depressed area extending circumferentially around the wheel rim, each member having a plurality of load bearing radially and laterally extending, spaced projections extending radially and laterally from the outer surface of each of said semi-circular members, each of said radially and laterally extending projections of one of said semi-circular members being diametrically opposed to a radially and laterally extending projection on the other of said semi-circular members when said semi-circular members are positioned on the wheel rim, each portion having a second semi-circular member surrounding the first named circular member of each respective portion, said second semi-circular member of each semi-circular portion being wider than said first named semi-circular member and said second semi-circular member being of greater diameter than said first named semi-circular member and spaced therefrom by the distance equal to the length of said radially and laterally extending projections, said first named semi-circular member, said projections and said second named semi-circular member of each semi-circular portion being integrally connected together, said wider second semi-circular member acting as a safety rim to support the tire in spaced radial relation to the rim upon deflation of the tire.

2. A device adapted to be positioned inside a tubeless tire and secured to a wheel rim of the drop-center type which supports the tire including, two semi-circular portions, each portion having a semi-circular member with an inner surface of a configuration to fit on the outer periphery of the wheel rim, each of said semi-circular members having a center portion extending therefrom, said center portion being adapted to fit in the depressed area extending circumferentially around the wheel rim, each member having a plurality of load bearing radially and laterally extending, spaced projections extending radially and laterally from the outer surface of each of said semi-circular members, each of said radially and laterally extending projections of one of said semi-circular members being diametrically opposed to a radially and laterally extending projection on the other of said semi-circular members when said semi-circular members are positioned on the wheel rim, each portion having a second semi-circular member surrounding the first named circular member of each respective portion, said second semi-circular member of each semi-circular portion being wider than said first named semi-circular member, said second semi-circular member being of greater diameter than said first named semi-circular member and spaced therefrom by the distance equal to the length of said radially and laterally extending projections, said first named semi-circular member, said projections and said second named semi-circular member of each semi-circular portion being integrally connected together, said wider second semi-circular member acting as a safety rim to support the tire in spaced radial relation to the rim upon deflation of the tire, means for securing said first named semi-circular member of each portion to the rim, said means including a pair of threaded openings in one portion and spaced in opposed relation to threaded openings in the other semi-circular portion to balance the device wherein it is positioned on the wheel rim, and screws including a gasket adapted to fit through openings in the wheel rim and in the threaded openings of each portion to hold said semi-circular portions on the wheel rim.

References Cited in the file of this patent

UNITED STATES PATENTS

| 2,053,245 | Girz | Sept. 1, 1936 |
| 2,074,284 | Stevenson | Mar. 16, 1937 |
| 2,262,780 | Sherwood | Nov. 18, 1941 |
| 2,775,282 | Kennedy | Dec. 25, 1956 |

FOREIGN PATENTS

| 350,128 | France | Aug. 22, 1904 |